(12) United States Patent
Husain et al.

(10) Patent No.: US 6,678,596 B2
(45) Date of Patent: Jan. 13, 2004

(54) GENERATING STEERING FEEL FOR STEER-BY-WIRE SYSTEMS

(75) Inventors: Muqtada Husain, Brownstown, MI (US); Benrouz Ashrafi, Dearborn, MI (US); Gregory Stout, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/152,460

(22) Filed: May 21, 2002

(65) Prior Publication Data
US 2003/0220727 A1 Nov. 27, 2003

(51) Int. Cl.[7] ................................................. G06F 7/00
(52) U.S. Cl. ........................................... 701/41; 701/42
(58) Field of Search .............................. 701/41, 42, 43, 701/44

(56) References Cited

U.S. PATENT DOCUMENTS

| | | |
|---|---|---|
| 4,771,846 A | 9/1988 | Venable et al. |
| 5,247,441 A | 9/1993 | Serizawa et al. |
| 5,347,458 A | 9/1994 | Serizawa et al. |
| 5,747,950 A | 5/1998 | Friedrichsen et al. |
| 6,079,513 A | 6/2000 | Nishizaki et al. |
| 6,097,286 A | 8/2000 | Discenzo |
| 6,176,341 B1 | 1/2001 | Ansari |

*Primary Examiner*—Yonel Beaulieu
(74) *Attorney, Agent, or Firm*—Brinks Hofer Gilson & Lione

(57) ABSTRACT

The present invention includes a system and a method for generating steering reaction torque in a steer-by-wire steering system. The system includes a manually steerable member; a feedback generator; a vehicle speed sensor; a steering position sensor; and a steering actuator load sensor. A control unit calculates a set of blended reaction torque values by receiving input signals from the steering position sensor and the steering actuator load sensor. The control unit operates on the input signals and computing a set of reaction torque values, and blending the reaction torque values into set of blended reaction torque values. The set of reaction torque equations comprises a plurality of non-linear functions that is adapted for real-time, continuous operation upon the input signals from the sensors. The set of blended reaction torque values is speed-sensitized based on vehicle speed and transmitted to the feedback generator to generate steering feel in the manually steerable member.

26 Claims, 5 Drawing Sheets

GENERATING STEERING FEEL FOR STEER-BY-WIRE SYSTEMS

BACKGROUND OF THE INVENTION

1. Technical Field of the Invention

The present invention relates to a steering apparatus for a vehicle that directs steerable wheels in response to operator input in which the steerable wheels are not mechanically coupled to the manually steerable member.

2. Description of the Prior Art

A typical automotive vehicle is steered by transmitting operations of a manually steerable member, such as a steering wheel, to a steering mechanism for directing steerable wheels for steering. Generally, the manually steerable member is located inside the vehicle passenger compartment, and the steerable wheels are located at the front of the vehicle. Thus, a suitable steering mechanism is necessary to couple the manually steerable member and the steerable wheels.

A representative steering mechanism is a rack-and-pinion type steering mechanism. In a rack-and-pinion steering mechanism, the rotational motion of the steering wheel is communicated through a steering column to a pinion gear at its distal end. The pinion gear is engaged with a rack gear disposed laterally between the steerable wheels, which in turn are coupled to the rack gear by knuckle arms and tie rods. In this manner, rotation of the steering wheel is translated into the lateral movement of the rack gear, which causes the steerable wheels to pivot in the desired direction. In general, mechanical steering mechanisms are power-assisted by hydraulic or electrical assist units.

Mechanical steering mechanisms such as described above have a number of limitations. As the manually steerable member and the steering mechanism are mechanically coupled in some fashion, the position of the manually steerable member is limited within the vehicle passenger compartment. Moreover, the size and weight of the coupling members limits the layout and performance of the vehicle. Lastly, representative steering mechanisms are designed for the receipt of a rotational input from the operator, meaning that the manually steerable member is generally a steering wheel. Thus, alternative steerable members, such as levers, handgrips, and pedals have been used in only limited circumstances.

In order to overcome such limitations, it has been proposed to utilize a steering system in which the manually steerable member is not mechanically coupled to the steerable wheels and the steerable wheels and steering movement is achieved by an electrically controlled motor, a so-called steer-by-wire system. In a steer-by-wire system, a steering actuator operates in response to detected values of various steering parameters, such as steering wheel angle and vehicle speed etc. The detected values are communicated electronically to the steering actuator from sensors, whereby the steering actuator orients the steerable wheels in the desired direction.

Steer-by-wire systems solve a number of problems presented above. In addition, there are a number of other advantages innate to steer-by-wire systems that were not apparent in its mechanically coupled counterpart. A steer-by-wire steering system can be easily integrated into other electronically controlled systems to increase the efficiency and performance of the vehicle.

Although a steer-by-wire system does present the foregoing advantages, it also presents a number of problems. Since there is no direct mechanical coupling between the operator and the steerable wheels, the operator does not receive any feedback from the road surface through the steering mechanism. In order to solve this problem, engineers have employed a reaction torque motor to simulate the feedback experienced by the vehicle operator. The reaction torque motor generates a reaction torque, generally to a steering wheel, based upon a number of steering parameters such as vehicle speed, steering wheel angle, and road surface condition.

U.S. Pat. No. 6,079,513 discloses a steering apparatus for a vehicle comprising a calculating means for calculating a target value for the reaction torque. The target value is characterized by a self-aligning torque term, an elastic resistance term, and an inertial resistance term. The self-aligning torque term is based on the detected values of vehicle speed and position of the steering mechanism. The elastic resistance term is proportional to the deviation between a detected value for a steering operating angle of a steering operating means and the detected value for the actual position. The inertial resistance term is proportional to a time-varying amount of the calculated deviation. Further disclosed was a turning condition sensor and means for correcting the reaction torque applied to the steerable member in the event that the vehicle approached its cornering limit in accordance with detected values of the vehicles turning condition.

The target value approach to generating a reaction torque in a steer-by-wire program does, however, present several problems. For example, the target value approach does not accurately reflect the instantaneous condition of the steerable wheels because the reaction torque is not calculated arithmetically based upon the currently sensed steering conditions. Additionally, the target values must be calibrated for varying driving conditions, involving a tedious process and increasing the amount of labor expended by engineers to tune the system.

BRIEF SUMMARY OF THE INVENTION

The present invention has been devised in order to solve the above problems. The present invention provides a steer-by-wire steering system capable of transmitting a reaction torque to a manually steerable member that is arithmetically computed and speed sensitive. The present invention generates the reaction torque by monitoring and sensing a plurality of driving conditions and then adapting the reaction torque applied to the manually steerable member based upon vehicle speed.

The principal features of this invention include a plurality of driving condition sensors or estimators adapted for determining (1) steering actuator load, (2) wheel slip angle, (3) steering angle, (4) yaw rate, (5) lateral acceleration and (6) vehicle speed. The sensors electronically transmit input values to a control unit that is adapted for arithmetically calculating initial reaction torque values in response thereto, assembling the reaction torque values into a set of blended reaction torque values, normalizing the blended reaction torque values into a final reaction torque value, and transmitting the final reaction torque value to a feedback generator.

Initially, the control unit selects a set of tuning parameters for each input signal. The tuning parameters are defined as: $A_{pi}$, $A_{hi}$, $B_{pi}$, $B_{hi}$, and their physical significance is discussed further herein. Each sensor produces an input signal $F_i$ that is independently operated upon by a plurality of reaction torque equations, $SWT_p(F_i)$ and $SWT_h(F_i)$, for arithmetically computing a set of initial reaction torque values. The control unit then blends the initial reaction torque values based upon the vehicle speed, v, and a speed blending parameter, $k_{bi}(V)$, thereby producing a set of blended reaction torque values, $SWT(F_i)$. Each blended reaction torque value is then assigned a weighting constant, $w_i$, where $w_i$ is determined by the vehicle speed. To calculate the final reaction torque, $T(F_i,v)$, the control unit sums the product $SWT(F_i)w_i$, and transmits this value to the feedback generator whereby reaction torque is generated in the manually steerable member.

Thus, the apparatus of the present invention obtains empirical data from a plurality of sensors and processes that data arithmetically in real time. The present invention further processes the empirical data by assigning a weighting factor to the reaction torque calculated from each input signal, as a function of vehicle speed. For example, at low vehicle speeds, yaw rate, lateral acceleration, actuator load and wheel slip angle are poor indicators of the feedback generally transmitted to a driver by a mechanically coupled steering mechanism. Consequently, each of the reaction torque values calculated in response to these input values is assigned a relatively low weighting factor. Conversely, at low vehicle speeds, steering angle is an important indicator of the feedback generally transmitted to a driver. Therefore, reaction torque value calculated in response to this is assigned a relatively high weighting factor.

By way of comparison, at high vehicle speeds actuator load, yaw rate, lateral acceleration, and wheel slip angle are good indicators of the feedback generally transmitted to a driver by a mechanically coupled steering mechanism. Consequently, each of the reaction torque values calculated in response to these input values are assigned a relatively high weighting factor.

Thus, in the present invention the reaction torque values calculated from each input signals are appropriately weighted as a function of vehicle speed and the steering feel desired. After the weighting process is completed, the initial reaction torque values are summed together to determine a final reaction torque value that is transmitted to the feedback generator whereby feedback is generated in the manually steerable member.

The present invention further encompasses an alternative steering system in which the steerable wheels have independent steering actuators rather than a unitary linkage disposed laterally between the steerable wheels. In this embodiment, there is at least one steering actuator load sensor disposed at the independent steering actuators for measuring the load placed on the actuators by the steerable wheels.

The above and further objects and features of the present invention will more fully be apparent from the following detailed description with accompanying drawings.

DETAILED DESCRIPTION OF THE PREFERRED EMBODIMENT

Figure 1:
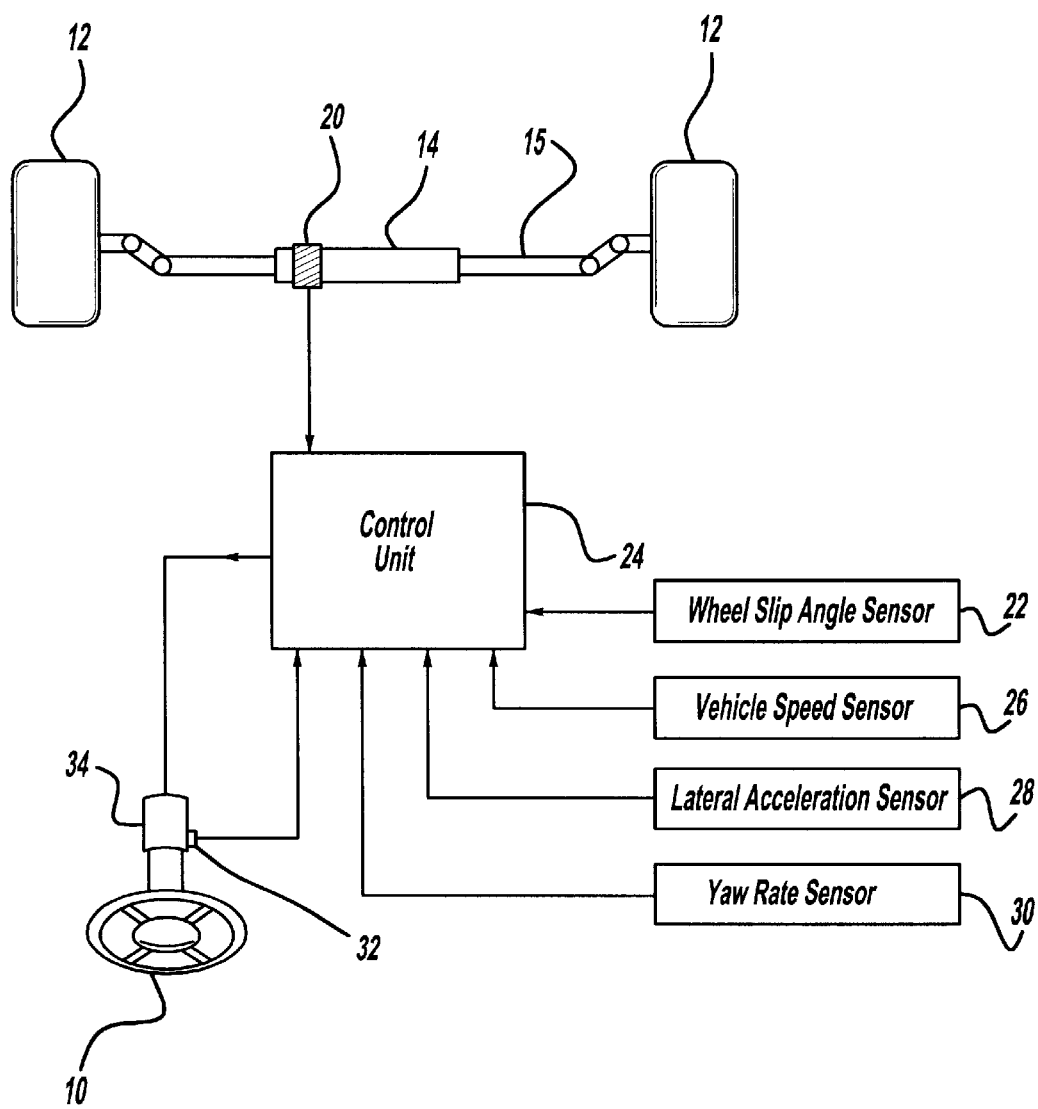
FIG. 1 is a schematic block diagram depicting the overall structure of a steering apparatus for a vehicle according to the present invention in which the steerable wheels are linked by a unitary steering actuator.

In accordance with the preferred embodiment of this invention, FIG. 1 depicts a block diagram of the overall structure of an apparatus for generating reaction torque in a manually steerable member. The steering apparatus is designed for steer-by-wire steering systems in which manually steerable member 10 is not mechanically linked to steerable wheels 12. Rather, control unit 24 receives electrical input from sensors (not shown) that detect the mechanical motion of manually steerable member 10, whereby the control unit 24 directs steering actuator 14 to actuate the motion of steerable wheels 12 in accordance with the vehicle operator's intent.

The steering actuator 14 is disposed such that it aligns coaxially with steering shaft 15. Steering shaft 15 is arranged such that it extends laterally between steerable wheels 12. Steering shaft 15 is adapted for lateral movement, such that steerable wheels 12 may be directed to the left or right by sliding steering shaft 15 in a corresponding direction. In order to slide the steering shaft 15 in a lateral direction, steering actuator 14 comprises a motor or other means suitable for displacing steering shaft 15 a distance determined by control unit 24.

Figure 2:
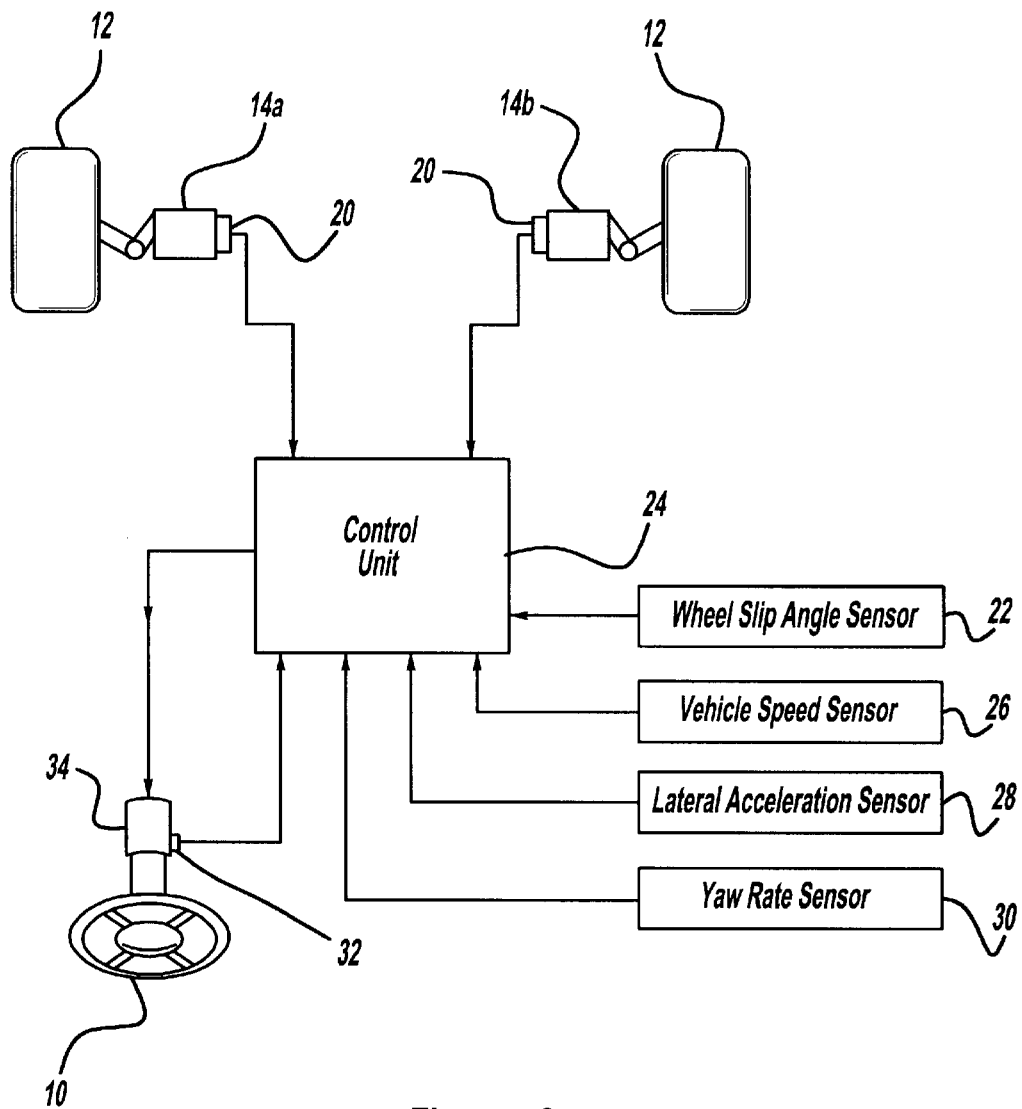
FIG. 2 is a schematic block diagram depicting the overall structure of a steering apparatus for a vehicle according to the present invention in which the steerable wheels are linked to independent steering actuators.

As shown in FIG. 2, the present invention is depicted as having independent steering actuators 14a, 14b disposed adjacent to the steerable wheels 12 for directing steerable wheels in a manner determined by control unit 24. As such, the steering actuator load is measured and transmitted by independent steering actuator load sensors 20 located at each steering actuator 14a, 14b. The control unit 24 is adapted for receiving input from the steering actuator load sensors 20, as well as from the wheel slip angle sensors 22, the steering position sensor 32, the vehicle speed sensor 26, the lateral acceleration sensor 28, and the yaw rate sensor 30.

Steering actuators 14, 14a, 14b are driven by a signal from the control unit 24 that receives an input signal from the steering angle sensor 32 corresponding to manipulation of the manually steerable member 10. As there is no mechanical coupling between the manually steerable member 10 and the steering actuators 14, 14a, 14b, a reaction torque must be generated artificially in the manually steerable member 10 to inform the vehicle operator of the actual direction of the steerable wheels 12 and the general steering condition of the vehicle.

A feedback generator 34 is coupled to manually steerable member 10 such that feedback generator 34 generates a reaction torque in manually steerable member 10. Feedback generator 34 generates the reaction torque in response to an electrical signal determined and transmitted by control unit 24, to which the feedback generator 34 is electronically coupled. Feedback generator 34 is adapted for generating a reaction torque that replicates a mechanical feedback to steerable member 10. The magnitude and direction of the reaction torque is calculated and speed-sensitized by the control unit 24. Thus, the vehicle operator encounters mechanical resistance when steering the vehicle from a straight orientation to a turning orientation. Conversely, the feedback generator 34 will provide the vehicle operator with mechanical assistance if the vehicle is being steered from a turning orientation to a straight orientation.

The control unit 24 is adapted for transmitting electrical signals to the feedback generator 34 that produces the reaction torque in manually steerable member 10 in accordance with the vehicle's steering condition. In displacing the steerable wheels 12 in accordance with the operator's intent, the steering actuator 14, 14a, 14b must exert a force to overcome the inertial and frictional forces experienced by the steerable wheels 12. A steering actuator load sensor 20 measures the load on the steering actuator 14, 14a, 14b and transmits this information to the control unit 24. Additionally, the manually steerable member 10 is coupled to a steering position sensor 32 for measuring and communicating the position of the manually steerable member 10. In a preferred embodiment, the control unit 24 is also coupled to a vehicle speed sensor 26, wheel slip angle sensors 22, a lateral acceleration sensor 28, and a yaw rate sensor 30, all of which may be placed at various positions throughout the vehicle.

Control unit 24 is adapted to receive input signals from the vehicle speed sensor 26, the steering actuator load sensor 20, wheel slip angle sensors 22, steering position sensor 32, yaw rate sensor 30, and lateral acceleration sensor 28. Each of the foregoing sensors 26, 20, 22, 32, 30, 28 captures appropriate driving condition, and in response thereto generates an input signal corresponding to a measurable quantity that has an influence on the steering condition of the vehicle. In the preferred embodiment the foregoing sensors 26, 20, 22, 32, 30, and 28 are described as sensing or detecting a particular quantity. However, the present invention also contemplates various embodiments in which one or any combination of the foregoing sensors 26, 20, 22, 32, 30, and 28 determines an input value by some other means, such as estimation based upon algorithmic processing. Nevertheless, each sensor provides the control unit 24 with a corresponding input signal.

The relationship between each sensor and its corresponding input signal to the control unit is shown below. The plurality of input signals $F_1$, $F_2$, $F_3$, $F_4$, and $F_5$ are collectively referred to as a set of input signals defined as $F_i$.

| Sensor | Input signal |
|---|---|
| Steering actuator load sensor 20 | $F_1$ |
| Wheel slip angle sensors 22 | $F_2$ |
| Steering position sensor 32 | $F_3$ |
| Yaw rate sensor 30 | $F_4$ |
| Lateral acceleration sensor 28 | $F_5$ |
| Vehicle speed sensor 26 | v |

Figure 3:
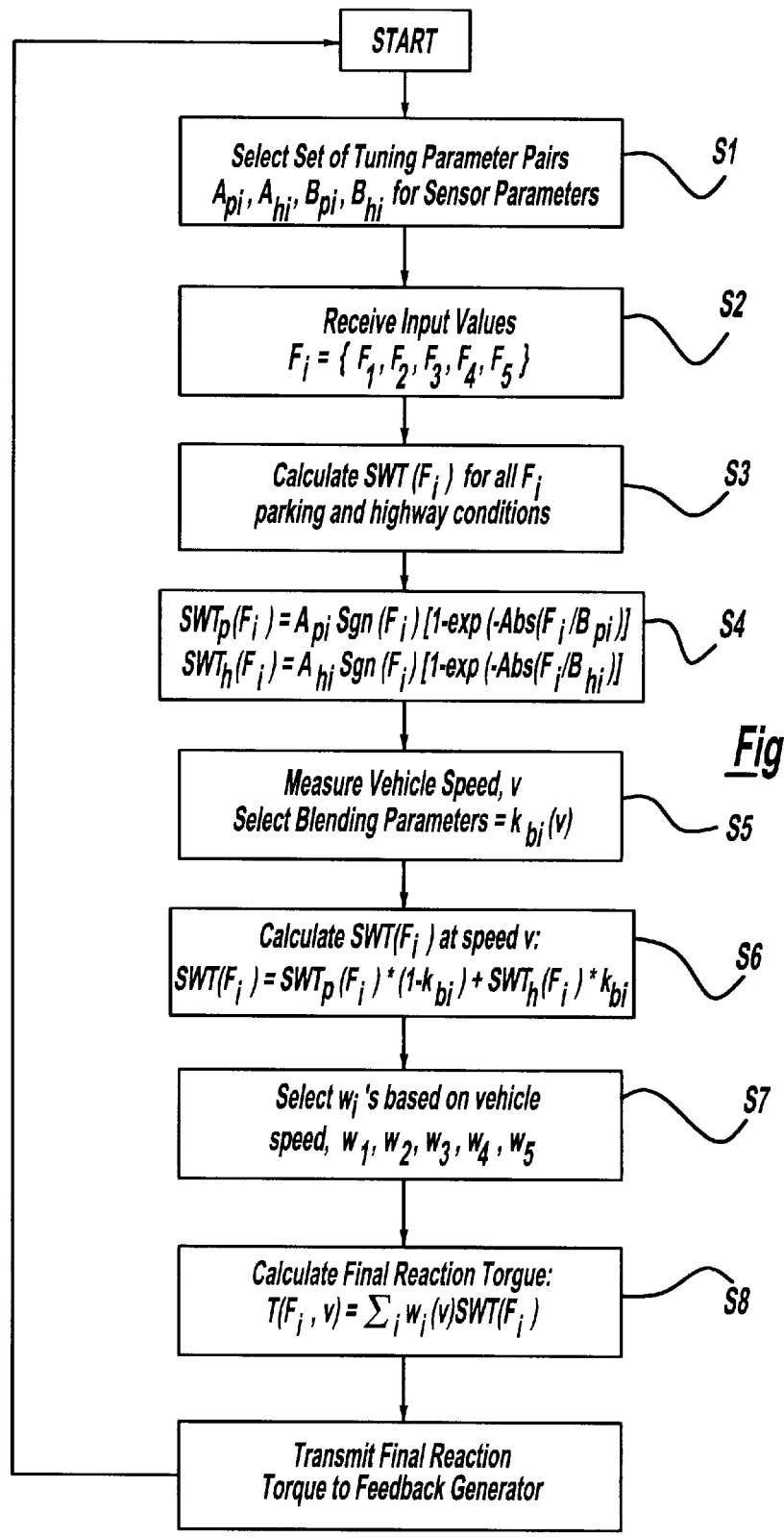
FIG. 3 is a flow chart illustrating the procedure of reaction torque control according to the present invention.

The control unit 24 determines the reaction torque according to a series of steps illustrated in FIG. 3. In step S1 control unit selects a plurality of tuning parameters for each input signal. The tuning parameters are defined as: $A_{pi}$, $A_{hi}$, $B_{pi}$, $B_{hi}$, where the subscript <p> denotes parking conditions and the subscript <h> denotes highway conditions. The tuning parameters are defined specifically for each input signal ($F_i$) since each input signal describes a different measurement for example when the Steering Torque is plotted against input signal $F_i$ (say for parking condition), $A_{pi}$ is a measure of asymptotic steering torque limit and $A_{pi}/B_{pi}$ is a measure of on-center gradient for this curve. Similarly, $A_{hi}$ is a measure of asymptotic steering torque limit and $A_{hi}/B_{hi}$ is a measure of on-center gradient for the highway condition.

In step S2, the control unit 24 receives the input signals $F_1$, $F_2$, $F_3$, $F_4$, and $F_5$.

In step S3, the control unit 24 calculates a set of initial reaction torque values, SWT, two functions for each of the $F_i$'s such that the initial reaction torque values are a set of functions SWT ($F_i$) corresponding to both parking and highway conditions. That is, for each input signal, there are two SWT functions incorporating the respective parking and highway tuning parameters. The first SWT function for a given input signal corresponding to parking conditions, is given as:

$$SWT_p(F_i) = A_{pi} \text{sgn}(F_i)[1 - \exp(-\text{Abs}(F_i/B_{pi}))], \quad (1)$$

where "sgn" is the "signum function" and is defined such that if $F_i$ is less than zero, then Sgn ($F_i$) equals negative one, and if $F_i$ is greater than zero, then Sgn ($F_i$) equals one. In other words, depending on the sign of the input signal, the signum function dictates a direction for the application of the reaction torque.

The second equation, the SWT function for a given input signal corresponding to highway conditions, is given by:

$$SWT_h(F_i) = A_{hi} \text{sgn}(F_i)[1 - \exp(-\text{Abs}(F_i/B_{hi}))], \quad (2)$$

In the preferred embodiment, the output of step S3 is ten (10) SWT values corresponding to each of the five $F_i$ evaluated under both parking and highway conditions. The control unit 24 calculates these SWT values in real-time, using sensor signals $F_i$.

In step S4, the control unit 24 detects the measured vehicle speed, v, from the vehicle speed sensor 26. The control unit 24 progresses to step S5 in which it selects a vehicle speed blending parameter, $k_{bi}$, for the purpose of weighting the respective $SWT_p(F_i)$ and $SWT_h(F_i)$ functions for each $F_i$. The vehicle speed blending parameter, $k_{bi}$, is a real number that is greater than zero but less than one.

The value of $k_{bi}$ is directly proportional to vehicle speed. That is, when the vehicle speed increases to a highway speed such as 100 kph, the value of $k_{bi}$ approaches 1. When the vehicle speed decreases to a parking or stopping speed the value of $k_{bi}$ approaches 0. The control unit 24 chooses $k_{bi}$ based upon programmed parameters that are selected based upon the type of vehicle utilizing the present invention. It is a feature of the present invention that the value of $k_{bi}$ may vary between different $F_i$.

Once the value of the vehicle speed blending parameter, $k_{bi}$, is chosen, the control unit 24 progresses to step S6 in which a vehicle speed blending function is implemented to properly weight the respective $SWT_p(F_i)$ and $SWT_h(F_i)$ functions for each $F_i$. Blending is accomplished by utilizing the following function:

$$SWT(F_i) = SWT_p(F_i)*(1-k_{bi}) + SWT_h(F_i)*k_{bi}, \quad (3)$$

where, as noted, the value of the vehicle speed blending parameter, $k_{bi}$, is appropriately chosen by the control unit 24.

Upon the completion of step S6, the input signal data has been processed to one function for each $F_i$ that has been manipulated to provide appropriate blending for different vehicle speeds. In the preferred embodiment, the set of $F_i$ values comprises input signals $F_1F_2$, $F_3$, $F_4$, and $F_5$, which have been operated upon to produce a set of $SWT_i$ values comprising the blended reaction torque values $SWT_1$, $SWT_2$, $SWT_3$, $SWT_4$, and $SWT_5$. Thus, step S6 concludes with a set of blended reaction torque values that are obtained using the set of $F_i$ values.

In order to properly normalize the blended reaction torque values $SWT_1$, $SWT_2$, $SWT_3$, $SWT_4$, and $SWT_5$, in step S7 the control unit 24 selects a set of normalizing values that are dependent upon speed, $w_i(v)$, where the set $w_i(v)$ consists of we $(v)$, $w_2(v)$, $w_3(v)$, $w_4(v)$, and $w_5(v)$. The numerical weight of each of the $w_i(v)$ values is predetermined based upon the type of vehicle in which the present invention is utilized and the general steering feel that the developers are attempting to create.

Once the control unit has selected the set of normalizing values $w_i(v)$, each of the $w_i(v)$ values are paired with the corresponding blended reaction torque values in step S8. The pairing operates such that $w_1(v)$ is paired with $SWT_1$, $w_2(v)$ is paired with $SWT_2$, and so on. Once each $w_i(v)$ is paired with its respective $SWT_i$ all of the $w_i(v)$ $SWT_i$ values are multiplied together and then summed to generate a final reaction torque. As shown in the following equation, the final reaction torque is the sum of normalized and blended reaction torque values including all of the measured input signals. That is, $$T = \sum_{i=1}^{5} w_i(v)SWT_i, \text{ over all values of } <i>, \tag{4}$$

where the Greek letter sigma, "$\Sigma$", indicates that the argument of the function is being summed over an index, $<i>$.

Once the final reaction torque, T, is calculated, control unit 24 transmits a signal to feedback generator 34 whereby a proper reaction torque is generated in manually steerable member 10.

Figure 4:
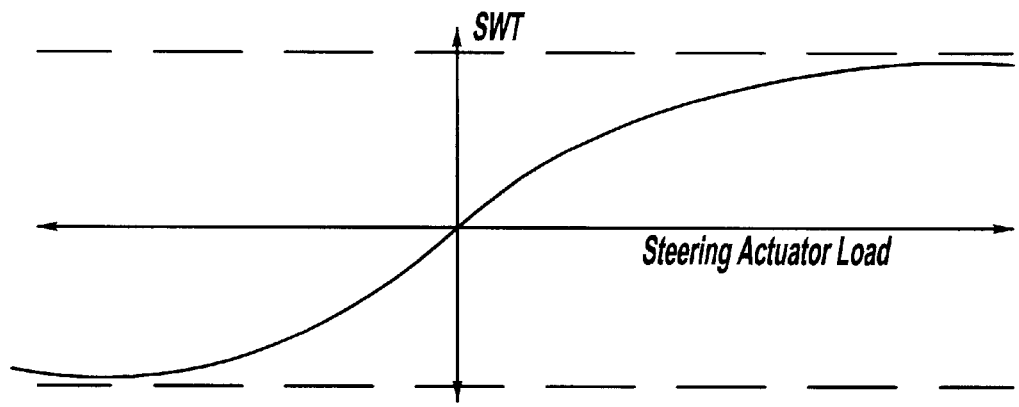
FIG. 4 is a typical graph showing the relationship between steering actuator load and steering reaction torque.

In accordance with the present invention, FIG. 4 is an example graph depicting the mathematical relationship between SWT ($F_1$) and $F_1$ where $F_1$ is the input signal representing the steering actuator load measured and communicated by the steering actuator load sensor 20. As shown, FIG. 4 is a graph of equation (1) or equation (2), showing the exponential relationship between the initial reaction torque value and the steering actuator load. Similar representative graphs could be shown for other input signals ($F_i$'s, for i=1 to 5).

Figure 5:
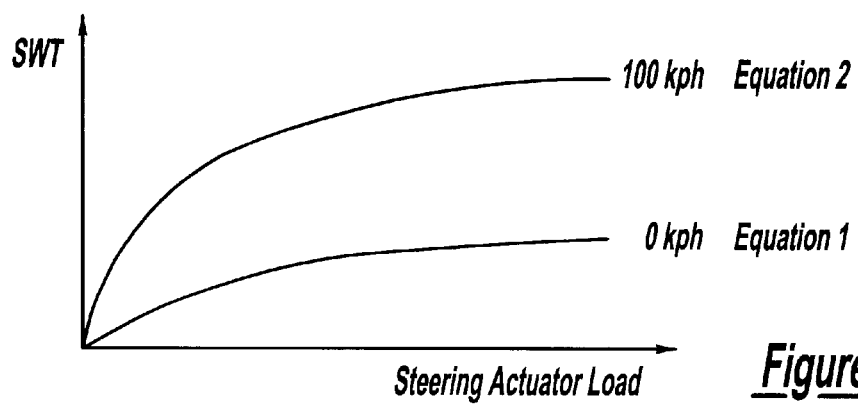
FIG. 5 is a graph showing a plurality of relationships between steering actuator load and steering reaction torque normalized based upon vehicle speed.

FIG. 5 is a graph similar to FIG. 4, except that it is focused on one quadrant of the graph. As shown, FIG. 5 is a graph of equation (1) in which the vehicle speed is approximately 0 kph and equation (2) in which the vehicle speed is approximately 100 kph. As indicated in FIG. 5, as the vehicle speed increases, the steering actuator load produces a relatively larger initial reaction torque thus enabling the speed sensitivity steering feedback feature.

Figure 6:
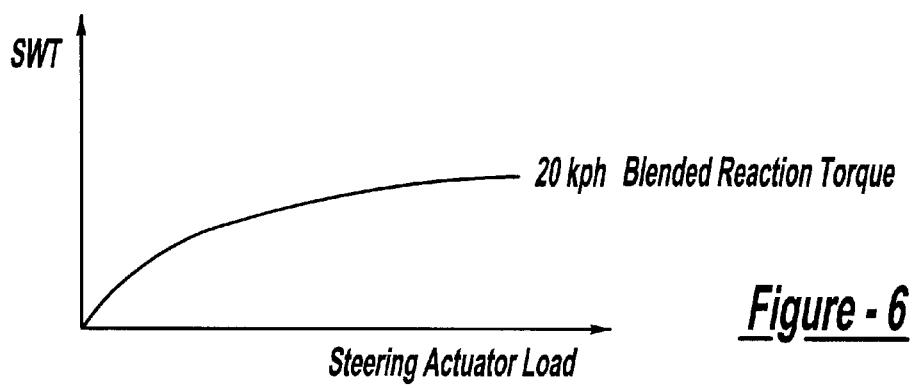
FIG. 6 is a graph showing a blended reaction torque value based upon steering actuator load.

FIG. 6 is a graph showing a blended reaction torque value based upon steering actuator load and a vehicle speed of 20 kph. That is, the initial reaction torque values of FIG. 5 have been blended by the vehicle speed blending parameter, $k_{bi}$. FIG. 6 represents how the control unit 24 progresses to step S6 in which a vehicle speed blending function is implemented to properly weight the respective $SWT_p$ ($F_1$) and $SWT_h$ ($F_1$) functions for the steering actuator load for a given vehicle speed.

Figure 7:
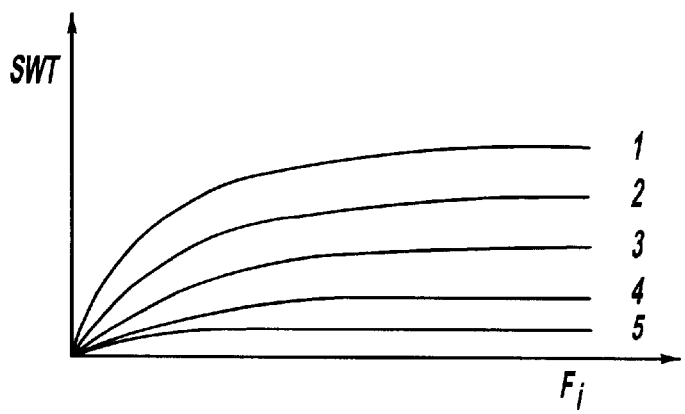
FIG. 7 is a graph showing a plurality of relationships between steering reaction torque and input signals $F_i$, where the subscript <i> denotes sensed parameters 1–5.

FIG. 7 is a schematic graph showing the relationship between $SWT_i$ and all of the $F_i$ contained in the preferred embodiment of the present invention. The curves are numbered in a fashion that corresponds to their respective grouping in the set of $F_i$. That is, $F_1$ is the input signal representing the steering actuator load measured and communicated by the steering actuator load sensor 20, $F_2$ is the input signal representing the wheel slip angle as measured and communicated by the wheel slip angle sensors 22, and so on.

Figure 8:
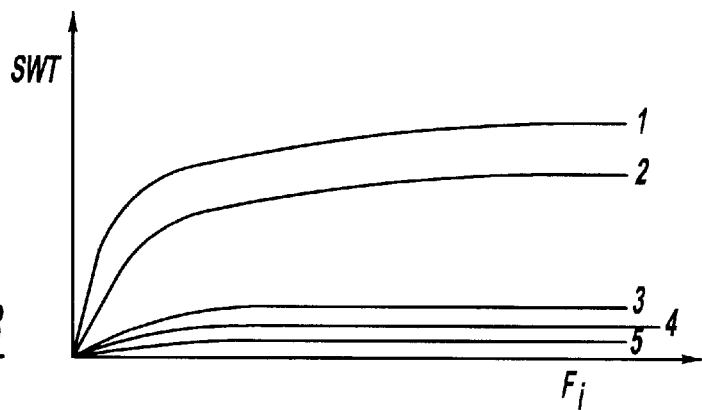
FIG. 8 is a graph showing a plurality of relationships between steering reaction torque and input signals $F_i$, where the subscript <i> denotes sensed parameters 1–5, and further showing that input signals 1–5 have been normalized according to vehicle speed.

FIG. 8 is a schematic graph showing the relationship between $SWT_i$ and all of the $F_i$ contained in the preferred embodiment of the present invention. As in FIG. 7, the curves are numbered in a fashion that corresponds to their respective grouping in the set of $F_i$. However, in FIG. 8, the curves have been normalized by the set of normalizing values $w_i(v)$, where each of the $w_i(v)$ values are paired with the corresponding blended reaction torque values as described previously. Although the respective curves are demonstrated in descending order from 1 to 5, any orientation of the curves is possible and depends upon the input parameters of the respective sensors as well as the particulars of the functions employed by the control unit 24.

Figure 9:
FIG. 9 is a graph showing the final relationship between steering reaction torque and input signals $F_i$, where <i> denotes sensed parameters 1–5, and further showing that $F_i$ have been summed to represent a final steering reaction torque in accordance with the present invention.

FIG. 9 is a schematic graph showing the final reaction torque, T, as a sum of all five curves from FIG. 8 corresponding to step S8 implemented by the control unit 24. Viewed together, FIGS. 4–9 provide a representation of how the control system receives raw data input signals and produces a final reaction torque, T, such that control unit 24 instructs feedback generator 34 to generate a reaction torque in a manually steerable member 10.

As this invention may be embodied in several forms without departing from the spirit of essential characteristics thereof, the preferred embodiments are therefore illustrative and not restrictive, since the scope of the invention is defined by the appended claims.

We claim:

1. A system for generating steerable member reaction torque in a motor vehicle having a steer-by-wire steering system, said system comprising:

a manually steerable member;

a feedback generator coupled to said manually steerable member for generating a reaction torque;

a vehicle speed sensor detecting vehicle speed;

a steering position sensor detecting a position of said manually steerable member;

a steering actuator load sensor detecting steering actuator load;

a control unit calculating a set of blended reaction torque values by (i) receiving input signals from the steering position sensor and the steering actuator load sensor, (ii) operating on said input signals with a set of reaction torque equations for arithmetically computing a set of reaction torque values, and (iii) blending said reaction torque values into set of blended reaction torque values based upon an input signal from said vehicle speed sensor;

wherein said set of reaction torque equations comprises a plurality of non-linear functions derived from empirical data and said set of reaction torque equations is adapted for real-time, continuous operation upon the input signals from the vehicle speed sensor, the steering position sensor, and the steering actuator load sensor; and whereby said set of blended reaction torque values is transmitted to said feedback generator such that said feedback generator generates the reaction torque in said manually steerable member.

2. The system of claim 1 wherein manually steerable member is a steering wheel.

3. The system of claim 2 wherein steering position sensor is a steering wheel angle sensor.

4. The system of claim 1 wherein said set of blended reaction torque values is speed-sensitized based upon said speed sensor input signal thereby forming a speed-sensitive reaction torque.

5. The system of claim 1 further comprising a lateral acceleration sensor.

6. The system of claim 1 further comprising a yaw rate sensor.

7. The system of claim 1 further comprising a wheel slip angle sensor.

8. The system of claim 1 further comprising a lateral acceleration sensor and a yaw rate sensor.

9. The system of claim 1 further comprising a lateral acceleration sensor and a wheel slip angle sensor.

10. The system of claim 1 further comprising a lateral acceleration sensor, a yaw rate sensor, and a wheel slip angle sensor.

11. The system of claim 1 further comprising a yaw rate sensor and a wheel slip angle sensor.

12. A motor vehicle having a steer-by-wire steering system, said motor vehicle comprising:
   a steering wheel;
   at least two steerable wheels coupled to a steering actuator for steering the motor vehicle, said steerable wheels mechanically decoupled from said steering wheel;
   a feedback generator coupled to said steering wheel for generating a reaction torque;
   a vehicle speed sensor detecting vehicle speed;
   a steering angle sensor detecting the position of said steering wheel;
   a steering actuator load sensor detecting steering actuator load;
   a yaw rate sensor detecting yaw rate;
   a lateral acceleration sensor detecting lateral acceleration;
   a wheel slip angle sensor detecting the wheel slip angle of said at least two steerable wheels;
   a control unit calculating a set of blended reaction torque values by i) receiving input signals from the steering position sensor, the steering actuator load sensor, the yaw rate sensor, the lateral acceleration sensor, and the wheel slip angle sensor, (ii) operating on said input signals with a set of reaction torque equations for arithmetically computing said set of reaction torque values, and (iii) blending said set of reaction torque values into a blended reaction torque value based upon an input signal from the vehicle speed sensor;
   wherein said set of reaction torque equations comprises a plurality of non-linear functions derived from empirical data and said set of reaction torque equations is adapted for real-time, continuous operation upon the input signals from the vehicle speed sensor, the steering position sensor, the steering actuator load sensor, the yaw rate sensor, the lateral acceleration sensor, and the wheel slip angle sensor;
   wherein said set of blended reaction torque values is speed-sensitized based upon said speed sensor input signal thereby forming a speed-sensitive reaction torque; and
   whereby said speed-sensitive reaction torque is transmitted to said feedback generator such that said feedback generator generates said reaction torque in said steering wheel.

13. The motor vehicle of claim 8 wherein as said speed sensor input signal indicates an increasing vehicle speed, said speed-sensitive reaction torque value is increased such that said reaction torque in said steering wheel is increased.

14. The motor vehicle of claim 8 wherein as said speed sensor input signal indicates a decreasing vehicle speed, said speed-sensitive reaction torque value is decreased such that said reaction torque in said steering wheel is decreased.

15. The motor vehicle of claim 8 wherein said steering actuator includes a unitary steering actuator mechanically coupled to said at least two steerable wheels.

16. The motor vehicle of claim 8 wherein said steering actuator is mechanically coupled to one of said at least two steerable wheels, and further comprising a second steering actuator mechanically coupled to another of said at least two steerable wheels.

17. A method of generating reaction torque in a steer-by-wire vehicle having a manually steerable member, said method comprising:
   coupling a feedback generator to a manually steerable member;
   determining vehicle speed;
   determining a steering position of said manually steerable member;
   determining a steering actuator load;
   deriving a set of reaction torque equations;
   calculating a set of reaction torque values in real-time based upon a determined vehicle speed, a determined steering position, and a determined steering actuator load;
   blending said set of reaction torque values into a blended reaction torque value based upon said determined vehicle speed;
   generating said reaction torque in said steering wheel based upon said blended reaction torque value.

18. The method of claim 17 wherein the step of determining steering actuator load includes sensing steering actuator load, and further wherein the step of determining a steering position of said manually steerable member includes sensing a position of said manually steerable member.

19. The method of claim 17 further comprising the step of determining a vehicle yaw rate.

20. The method of claim 19 wherein the step of determining a vehicle yaw rate includes sensing a vehicle yaw rate.

21. The method of claim 17 further comprising the step of determining a vehicle lateral acceleration.

22. The method of claim 21 wherein the step of determining a vehicle lateral acceleration includes sensing a vehicle lateral acceleration.

23. The method of claim 17 further comprising the step of determining a wheel slip angle.

24. The method of claim 23 wherein the step of determining a wheel slip angle includes sensing a wheel slip angle.

25. The method of claim 17 further comprising the step of speed-sensitizing said blended reaction torque based upon said determined vehicle speed.

26. The method of claim 17 further comprising the step of selecting tuning parameters to create a desired steering feel.

* * * * *

UNITED STATES PATENT AND TRADEMARK OFFICE
CERTIFICATE OF CORRECTION

PATENT NO. : 6,678,596 B2
DATED : January 13, 2004
INVENTOR(S) : Muqtada Husain et al.

It is certified that error appears in the above-identified patent and that said Letters Patent is hereby corrected as shown below:

Title page,
Item [75], Inventors, delete "Benrouz Ashrafi," and substitute -- Behrouz Ashrafi, -- in its place.

Signed and Sealed this

Thirteenth Day of July, 2004

JON W. DUDAS
*Acting Director of the United States Patent and Trademark Office*